United States Patent
Chishti et al.

(10) Patent No.: US 11,425,248 B2
(45) Date of Patent: *Aug. 23, 2022

(54) TECHNIQUES FOR HYBRID BEHAVIORAL PAIRING IN A CONTACT CENTER SYSTEM

(71) Applicant: Afiniti, Ltd., Hamilton (BM)

(72) Inventors: Zia Chishti, Washington, DC (US); Vikash Khatri, Alexandria, VA (US)

(73) Assignee: Afiniti, Ltd., Hamilton (BM)

(*) Notice: Subject to any disclaimer, the term of this patent is extended or adjusted under 35 U.S.C. 154(b) by 0 days.

This patent is subject to a terminal disclaimer.

(21) Appl. No.: 16/921,649

(22) Filed: Jul. 6, 2020

(65) Prior Publication Data

US 2020/0336593 A1 Oct. 22, 2020

Related U.S. Application Data

(63) Continuation of application No. 16/438,197, filed on Jun. 11, 2019, now Pat. No. 10,708,431, which is a
(Continued)

(51) Int. Cl.
*H04M 3/523* (2006.01)

(52) U.S. Cl.
CPC ....... *H04M 3/5232* (2013.01); *H04M 3/5233* (2013.01); *H04M 3/5235* (2013.01); *H04M 2201/18* (2013.01); *H04M 2201/36* (2013.01)

(58) Field of Classification Search
None
See application file for complete search history.

(56) References Cited

U.S. PATENT DOCUMENTS

| 5,155,763 A | 10/1992 | Bigus et al. |
| 5,206,903 A | 4/1993 | Kohler et al. |

(Continued)

FOREIGN PATENT DOCUMENTS

| AU | 2008349500 C1 | 5/2014 |
| AU | 2009209317 B2 | 5/2014 |

(Continued)

OTHER PUBLICATIONS

Afiniti, "Afiniti® Enterprise Behavioral Pairing™ Improves Contact Center Performance," White Paper, retrieved online from URL: <http://www.afinitit,com/wp-content/uploads/2016/04/Afiniti_White-Paper_Web-Email.pdf> 11 pages (2016).

(Continued)

*Primary Examiner* — Quynh H Nguyen
(74) *Attorney, Agent, or Firm* — Wilmer Cutler Pickering Hale and Dorr LLP

(57) ABSTRACT

Techniques for hybrid behavioral pairing in a contact center system are disclosed. In one embodiment, the techniques may be realized as a method for hybrid behavioral pairing in a contact center system comprising: determining a first ordering of a plurality of agents according to a behavioral pairing strategy with a balanced agent utilization; determining a second ordering of the plurality of agents according to a performance-based routing strategy with an unbalanced agent utilization; determining a third ordering of the plurality of agents according to a combination of the first ordering and the second ordering having a skewed agent utilization between the balanced agent utilization and the unbalanced agent utilization; and outputting a hybrid behavioral pairing model based on the third ordering for connecting a contact to an agent of the plurality of agents in the contact center system.

20 Claims, 8 Drawing Sheets

Related U.S. Application Data continuation of application No. 15/687,000, filed on Aug. 25, 2017, now Pat. No. 10,320,985, which is a continuation of application No. 14/956,086, filed on Dec. 1, 2015, now Pat. No. 9,781,269, which is a continuation-in-part of application No. 14/871,658, filed on Sep. 30, 2015, now Pat. No. 9,300,802, which is a continuation-in-part of application No. 14/530,058, filed on Oct. 31, 2014, now Pat. No. 9,277,055, which is a continuation of application No. 13/843,724, filed on Mar. 15, 2013, now Pat. No. 8,879,715, said application No. 14/871,658 is a continuation-in-part of application No. 12/021,251, filed on Jan. 28, 2008, now Pat. No. 9,712,679.

(60) Provisional application No. 61/615,779, filed on Mar. 26, 2012, provisional application No. 61/615,772, filed on Mar. 26, 2012, provisional application No. 61/615,788, filed on Mar. 26, 2012.

(56) References Cited

U.S. PATENT DOCUMENTS

| | | |
|---|---|---|
| 5,311,572 A | 5/1994 | Friedes et al. |
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,044,355 A | 3/2000 | Crockett et al. |
| 6,044,368 A | 3/2000 | Powers |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |
| 6,192,122 B1 | 2/2001 | Flockhart et al. |
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,526,135 B1 | 2/2003 | Paxson |
| 6,528,135 B1 | 3/2003 | Egret et al. |
| 6,532,088 B1 | 3/2003 | Dantu et al. |
| 6,535,600 B1 | 3/2003 | Fisher et al. |
| 6,535,601 B1 | 3/2003 | Flockhart et al. |
| 6,553,113 B1 | 4/2003 | Dhir et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,744,878 B1 | 6/2004 | Komissarchik et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,895,083 B1 | 5/2005 | Bers et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,913,063 B1 | 3/2011 | Lyerly |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,306,212 B2 | 11/2012 | Arora |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,761,380 B2 | 6/2014 | Kohler et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,831,203 B2 | 9/2014 | Chang et al. |
| 8,831,207 B1 | 9/2014 | Agarwal |
| 8,855,292 B1 | 10/2014 | Brunson |
| 8,879,715 B2 | 11/2014 | Spottiswoode et al. |
| 8,903,079 B2 | 12/2014 | Xie et al. |
| 8,913,736 B2 | 12/2014 | Kohler et al. |
| 8,929,537 B2 | 1/2015 | Chishti et al. |
| 8,938,063 B1 | 1/2015 | Hackbarth et al. |
| 8,995,647 B2 | 3/2015 | Li et al. |
| 9,020,137 B2 | 4/2015 | Chishti et al. |

(56) References Cited

U.S. PATENT DOCUMENTS

| | | |
|---|---|---|
| 9,025,757 B2 | 5/2015 | Spottiswoode et al. |
| 9,148,512 B1 | 9/2015 | Kumar et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,712,676 B1 | 7/2017 | Chishti |
| 9,712,679 B2 | 7/2017 | Chishti et al. |
| 10,135,987 B1 | 11/2018 | Chishti et al. |
| 2001/0032120 A1 | 10/2001 | Stuart et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0059029 A1 | 3/2003 | Mengshoel et al. |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0117299 A1 | 6/2004 | Algiene et al. |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0062374 A1 | 3/2006 | Gupta |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0256955 A1 | 11/2006 | Laughlin et al. |
| 2006/0262918 A1 | 11/2006 | Karnalkar et al. |
| 2006/0262922 A1 | 11/2006 | Margulies et al. |
| 2007/0036323 A1 | 2/2007 | Travis |
| 2007/0071222 A1 | 3/2007 | Flockhart et al. |
| 2007/0116240 A1 | 5/2007 | Foley et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0211881 A1 | 9/2007 | Parker-Stephen |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0004933 A1 | 1/2008 | Gillespie |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0095355 A1 | 4/2008 | Mahalaha et al. |
| 2008/0118052 A1 | 5/2008 | Houmaidi et al. |
| 2008/0144803 A1 | 6/2008 | Jaiswal et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0205611 A1 | 8/2008 | Jordan et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0171729 A1 | 7/2009 | Anisimov et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0305172 A1 | 12/2009 | Tanaka et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1 | 3/2010 | Afzal |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142689 A1 | 6/2010 | Hansen et al. |
| 2010/0142698 A1 | 6/2010 | Spottiswoode et al. |
| 2010/0158238 A1 | 6/2010 | Saushkin |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0166235 A1 | 6/2012 | Klemm |
| 2012/0183131 A1 | 7/2012 | Kohler et al. |
| 2012/0224680 A1 | 9/2012 | Spottiswoode et al. |
| 2012/0278136 A1 | 11/2012 | Flockhart et al. |
| 2012/0300920 A1 | 11/2012 | Fagundes et al. |
| 2013/0003959 A1 | 1/2013 | Nishikawa et al. |
| 2013/0022194 A1 | 1/2013 | Flockhart et al. |
| 2013/0051545 A1 | 2/2013 | Ross et al. |
| 2013/0058475 A1 | 3/2013 | Pierce et al. |
| 2013/0251137 A1 | 9/2013 | Chishti et al. |
| 2013/0287202 A1 | 10/2013 | Flockhart et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0119533 A1 | 5/2014 | Spottiswoode et al. |
| 2014/0140494 A1 | 5/2014 | Zhakov |
| 2014/0233719 A1 | 8/2014 | Vymenets et al. |
| 2014/0321413 A1 | 10/2014 | Luan et al. |
| 2014/0341370 A1 | 11/2014 | Li et al. |
| 2015/0055772 A1 | 2/2015 | Klemm et al. |
| 2015/0117632 A1 | 4/2015 | Konig et al. |
| 2015/0281448 A1 | 10/2015 | Putra et al. |
| 2016/0080573 A1 | 3/2016 | Chishti |

(56) References Cited

U.S. PATENT DOCUMENTS

| | | |
|---|---|---|
| 2018/0109680 A1 | 4/2018 | Korolev et al. |
| 2018/0159977 A1* | 6/2018 | Danson .............. H04M 3/5232 |

FOREIGN PATENT DOCUMENTS

| | | |
|---|---|---|
| AU | 2009311534 B2 | 8/2014 |
| CN | 101087271 A | 12/2007 |
| CN | 101090417 A | 12/2007 |
| CN | 101645987 A | 2/2010 |
| CN | 101834953 A | 9/2010 |
| CN | 101931713 A | 12/2010 |
| CN | 102164073 A | 8/2011 |
| CN | 102238291 A | 11/2011 |
| CN | 102300009 A | 12/2011 |
| CN | 102300012 A | 12/2011 |
| CN | 102387264 A | 3/2012 |
| CN | 102387265 A | 3/2012 |
| CN | 102496265 A | 6/2012 |
| CN | 102572139 A | 7/2012 |
| CN | 102724296 A | 10/2012 |
| CN | 102890799 A | 1/2013 |
| CN | 103023983 A | 4/2013 |
| CN | 103024216 A | 4/2013 |
| CN | 103684874 A | 3/2014 |
| CN | 102301688 B | 5/2014 |
| CN | 104063756 A | 9/2014 |
| CN | 102017591 B | 11/2014 |
| CN | 104239020 A | 12/2014 |
| CN | 104243730 A | 12/2014 |
| CN | 104683394 A | 6/2015 |
| CN | 104956381 A | 9/2015 |
| DE | 102004061512 A1 | 6/2006 |
| EP | 0493292 A2 | 7/1992 |
| EP | 0949793 A1 | 10/1999 |
| EP | 1032188 A1 | 8/2000 |
| EP | 1335572 A2 | 8/2003 |
| JP | 11-098252 A | 4/1999 |
| JP | 2000-069168 A | 3/2000 |
| JP | 2000-078291 A | 3/2000 |
| JP | 2000-078292 A | 3/2000 |
| JP | 2000-092213 A | 3/2000 |
| JP | 2000-507420 A | 6/2000 |
| JP | 2000-236393 A | 8/2000 |
| JP | 2000-253154 A | 9/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2009-081627 A | 4/2009 |
| JP | 2011-511533 A | 4/2011 |
| JP | 2011-511536 A | 4/2011 |
| JP | 2012-075146 A | 4/2012 |
| JP | 5421928 B2 | 2/2014 |
| JP | 5631326 B2 | 11/2014 |
| JP | 5649575 B2 | 1/2015 |
| JP | 2015-514371 A | 5/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-1999/17517 A1 | 4/1999 |
| WO | WO-2001/063894 A2 | 8/2001 |
| WO | WO-2006/124113 A2 | 11/2006 |
| WO | WO-2009/097018 A1 | 8/2009 |
| WO | WO-2010/053701 A2 | 5/2010 |
| WO | WO-2011/081514 A1 | 7/2011 |
| WO | WO-2015/100391 A1 | 7/2015 |

OTHER PUBLICATIONS

Anonymous. (2006) "Performance Based Routing in Profit Call Centers," The Decision Makers' Direct, located at www.decisioncraft. com, Issue Jun. 2002 (3 pages).

Canadian Office Action issued by the Canada Intellectual Property Office for Canadian Application No. 2,993,380 dated Nov. 27, 2018 (5 pages).

Canadian Office Action issued in Canadian Patent Application No. 2713526, dated Oct. 25, 2016, 7 pages.

Cleveland, William S., "Robust Locally Weighted Regression and Smoothing Scatterplots," Journal of the American Statistical Association, vol. 74, No. 368, Dec. 1979, pp. 829-836 (8 pages).

Extended European Search Report issued by the European Patent Office for European Application No. 18168620.5 dated Jun. 12, 2018 (9 pages).

Extended European Search Report issued by the European Patent Office for European Patent Application No. 17154781.3 dated May 4, 2017, (7 pages).

Extended European Search Report issued by the European Patent Office for European Patent Application No. 17171761.4 dated Aug. 30, 2017, (8 pages).

Gans, N. et al., "Telephone Call Centers: Tutorial, Review and Research Prospects," Manufacturing & Service Operations Management, vol. 5, No. 2, 2003, pp. 79-141, (84 pages).

International Preliminary Report on Patentability issued in connection with PCT Application No. PCT/US2009/066254 dated Jun. 14, 2011 (6 pages).

International Search Report and Written Opinion issued by the European Patent Office as International Searching Authority for International Application No. PCT/IB2016/001762 dated Feb. 20, 2017 (15 pages).

International Search Report and Written Opinion issued by the European Patent Office as International Searching Authority for International Application No. PCT/IB2016/001776 dated Mar. 3, 2017 (16 pages).

International Search Report and Written Opinion issued by the European Patent Office as International Searching Authority for International Application No. PCT/IB2017/000570 dated Jun. 30, 2017 (13 pages).

International Search Report issued in connection with International Application No. PCT/US13/33268 dated May 31, 2013 (2 pages).

International Search Report issued in connection with PCT Application No. PCT/US/2009/054352 dated Mar. 12, 2010, 5 pages.

International Search Report issued in connection with PCT Application No. PCT/US2008/077042 dated Mar. 13, 2009 (3 pages).

International Search Report issued in connection with PCT Application No. PCT/US2009/031611 dated Jun. 3, 2009 (5 pages).

International Search Report issued in connection with PCT Application No. PCT/US2009/066254 dated Feb. 24, 2010 (4 pages).

International Search Report issued in connection with PCT/US2009/061537 dated Jun. 7, 2010 (5 pages).

International Search Report issued in connection with PCT/US2013/033261 dated Jun. 14, 2013 (3 pages).

International Search Report issued in connection with PCT/US2013/33265 dated Jul. 9, 2013 (2 pages).

Ioannis Ntzoufras "Bayesian Modeling Using Winbugs An Introduction", Department of Statistices, Athens University of Economics and Business, Wiley-Interscience, A John Wiley & Sons, Inc., Publication, Chapter 5, Jan. 1, 2007, pp. 155-220 (67 pages).

Japanese Office Action issued by the Japan Patent Office for Application No. 2015-503396 dated Jun. 29, 2016 (7 pages).

Japanese Office Action issued by the Japanese Patent Office for Japanese Application No. 2016-159338 dated Oct. 11, 2017 (12 pages).

Japanese Office Action issued by the Japanese Patent Office for Japanese Application No. 2016-189126 dated Oct. 19, 2017 (24 pages).

(56) References Cited

OTHER PUBLICATIONS

Koole, G. (2004). "Performance Analysis and Optimization in Customer Contact Centers," Proceedings of the Quantitative Evaluation of Systems, First International Conference, Sep. 27-30, 2004 (4 pages).

Koole, G. et al. (Mar. 6, 2006). "An Overview of Routing and Staffing Algorithms in Multi-Skill Customer Contact Centers," Manuscript, 42 pages.

Notice of Reasons for Rejection issued by the Japan Patent Office for Japanese Application No. 2017-514350 dated Dec. 5, 2018 (12 pages).

Notice of Reasons for Rejection issued by the Japan Patent Office for Japanese Application No. 2018-528305 dated Oct. 17, 2018 (6 pages).

Notice of Reasons for Rejection issued by the Japan Patent Office for Japanese Application No. 2018-528314 dated Oct. 17, 2018 (5 pages).

Notification of First Office Action issued by the China National Intellectual Property Administration for Chinese Application No. 201680070038.3 dated Nov. 26, 2018 (26 pages).

Ntzoufras, "Bayesian Modeling Using Winbugs". Wiley Interscience, Chapter 5, Normal Regression Models, Oct. 18, 2007, Redacted version, pp. 155-220 (67 pages).

Press, W. H. and Rybicki, G. B., "Fast Algorithm for Spectral Analysis of Unevenly Sampled Data," The Astrophysical Journal, vol. 338, Mar. 1, 1989, pp. 277-280 (4 pages).

Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.

Stanley et al., "Improving call center operations using performance-based routing strategies," Calif. Journal of Operations Management, 6(1), 24-32, Feb. 2008; retrieved from http://userwww.sfsu.edu/saltzman/Publist.html.

Subsequent Substantive Examination Report issued in connection with Philippines Application No. 1-2010-501705 dated Jul. 14, 2014 (1 page).

Substantive Examination Report issued in connection with Philippines Application No. 1/2011/500868 dated May 2, 2014 (1 page).

Written Opinion of the International Searching Authority issued in connection with International Application No. PCT/US13/33268 dated May 31, 2013, 7 pages.

Written Opinion of the International Searching Authority issued in connection with PCT Application No. PCT/US/2009/054352 dated Mar. 12, 2010, 5 pages.

Written Opinion of the International Searching Authority issued in connection with PCT Application No. PCT/US2008/077042 dated Mar. 13, 2009, 6 pages.

Written Opinion of the International Searching Authority issued in connection with PCT Application No. PCT/US2009/031611 dated Jun. 3, 2009, 7 pages.

Written Opinion of the International Searching Authority issued in connection with PCT Application No. PCT/US2009/066254 dated Feb. 24, 2010, 5 pages.

Written Opinion of the International Searching Authority issued in connection with PCT/US2009/061537 dated Jun. 7, 2010, 10 pages.

Written Opinion of the International Searching Authority issued in connection with PCT/US2013/033261 dated Jun. 14, 2013, 7 pages.

Written Opinion of the International Searching Authority issued in connection with PCT/US2013/33265 dated Jul. 9, 2013, 7 pages.

\* cited by examiner

TECHNIQUES FOR HYBRID BEHAVIORAL PAIRING IN A CONTACT CENTER SYSTEM

CROSS-REFERENCE TO RELATED APPLICATIONS

This application is a continuation of U.S. patent application Ser. No. 16/438,197, filed Jun. 11, 2019, now U.S. Pat. No. 10,708,431, issued Jul. 7, 2020, which is a continuation of U.S. patent application Ser. No. 15/687,000, filed Aug. 25, 2017, now U.S. Pat. No. 10,320,985, issued Jun. 11, 2019, which is a continuation of U.S. patent application Ser. No. 14/956,086, filed Dec. 1, 2015, now U.S. Pat. No. 9,781,269, issued Oct. 3, 2017, which is a continuation-in-part of U.S. patent application Ser. No. 14/871,658, filed Sep. 30, 2015, now U.S. Pat. No. 9,300,802, issued Mar. 29, 2016, which is a continuation-in-part of U.S. patent application Ser. No. 12/021,251, filed Jan. 28, 2008, now U.S. Pat. No. 9,712,679, issued Jul. 18, 2017, and is a continuation-in-part of U.S. patent application Ser. No. 14/530,058, filed Oct. 31, 2014, now U.S. Pat. No. 9,277,055, issued Mar. 1, 2016, which is a continuation of U.S. patent application Ser. No. 13/843,724, filed Mar. 15, 2013, now U.S. Pat. No. 8,879,715, issued Nov. 4, 2014, which claims priority to U.S. Provisional Patent Application No. 61/615,788, filed Mar. 26, 2012, U.S. Provisional Patent Application No. 61/615,779, filed Mar. 26, 2012, and U.S. Provisional Patent Application No. 61/615,772, filed Mar. 26, 2012, each of which is hereby incorporated by reference in their entirety as if fully set forth herein.

This application is also related to U.S. patent application Ser. No. 14/956,074, entitled "Techniques for Hybrid Behavioral Pairing in a Contact Center System," filed Dec. 1, 2015, and U.S. patent application Ser. No. 15/686,945, entitled "Techniques for Hybrid Behavioral Pairing in a Contact Center System," filed Aug. 25, 2017.

FIELD OF THE DISCLOSURE

This disclosure generally relates to contact centers and, more particularly, to techniques for hybrid behavioral pairing in a contact center system.

BACKGROUND OF THE DISCLOSURE

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email) or outbound contacts. At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy. In some contact centers, contacts or agents are assigned into different "skill groups" or "queues" prior to applying a FIFO assignment strategy within each such skill group or queue. These "skill queues" may also incorporate strategies for prioritizing individual contacts or agents within a baseline FIFO ordering. For example, a high-priority contact may be given a queue position ahead of other contacts who arrived at an earlier time, or a high-performing agent may be ordered ahead of other agents who have been waiting longer for their next call. Regardless of such variations in forming one or more queues of callers or one or more orderings of available agents, contact centers typically apply FIFO to the queues or other orderings. Once such a FIFO strategy has been established, assignment of contacts to agents is automatic, with the contact center assigning the first contact in the ordering to the next available agent, or assigning the first agent in the ordering to the next arriving contact. In the contact center industry, the process of contact and agent distribution among skill queues, prioritization and ordering within skill queues, and subsequent FIFO assignment of contacts to agents is managed by a system referred to as an "Automatic Call Distributor" ("ACD").

Some contact centers may use a "performance based routing" or "PBR" approach to ordering the queue of available agents. For example, when a contact arrives at a contact center with a plurality of available agents, the ordering of agents available for assignment to that contact would be headed by the highest-performing available agent (e.g., the available agent with the highest sales conversion rate, the highest customer satisfaction scores, the shortest average handle time, the highest performing agent for the particular contact profile, the highest customer retention rate, the lowest customer retention cost, the highest rate of first-call resolution). PBR ordering strategies attempt to maximize the expected outcome of each contact-agent interaction but do so typically without regard for utilizing agents in a contact center uniformly. Consequently, higher-performing agents may receive noticeably more contacts and feel overworked, while lower-performing agents may receive fewer contacts and idle longer, potentially reducing their opportunities for training and improvement as well as potentially reducing their compensation.

In view of the foregoing, it may be understood that there is a need for a system that both attempts to utilize agents more evenly than PBR while improving contact center performance beyond what FIFO strategies deliver.

SUMMARY OF THE DISCLOSURE

Techniques for hybrid behavioral pairing in a contact center system are disclosed. In one embodiment, the techniques may be realized as a method for hybrid behavioral pairing in a contact center system comprising: determining, by at least one computer processor communicatively coupled to the contact center system, a first ordering of a plurality of agents according to a behavioral pairing strategy with a balanced agent utilization; determining, by the at least one computer processor, a second ordering of the plurality of agents according to a performance-based routing strategy with an unbalanced agent utilization; determining, by the at least one computer processor, a third ordering of the plurality of agents according to a combination of the first ordering and the second ordering having a skewed agent utilization between the balanced agent utilization and the unbalanced agent utilization; and outputting, by the at least one computer processor, a hybrid behavioral pairing model based on the third ordering for connecting a contact to an agent of the plurality of agents in the contact center system.

In accordance with other aspects of this embodiment, wherein the behavioral pairing strategy may be a diagonal pairing strategy.

In accordance with other aspects of this embodiment, wherein the method may further comprise determining, by the at least one computer processor, a target amount of skew for the skewed agent utilization.

In accordance with other aspects of this embodiment, wherein the combination of the first ordering and the second ordering is a weighted sum according to the target amount of skew.

In accordance with other aspects of this embodiment, wherein the first ordering can be expressed as percentiles or percentile ranges.

In accordance with other aspects of this embodiment, wherein the third ordering can be expressed as percentiles or percentile ranges adjusted according to the combination of the first ordering and the second ordering.

In accordance with other aspects of this embodiment, wherein the hybrid behavioral pairing model preferably pairs a higher-performing agent more frequently than a lower-performing agent.

In accordance with other aspects of this embodiment, wherein the hybrid behavioral pairing model preferably pairs a higher-performing agent with a greater number of contact types than a lower-performing agent.

In accordance with other aspects of this embodiment, wherein the hybrid behavioral pairing model preferably pairs a higher-performing agent with a higher-frequency contact type than a lower-performing agent.

In another embodiment, the techniques may be realized as a system for hybrid behavioral pairing in a contact center system comprising at least one computer processor communicatively coupled to the contact center system, wherein the at least one computer processor is configured to: determine a first ordering of a plurality of agents according to a behavioral pairing strategy with a balanced agent utilization; determine a second ordering of the plurality of agents according to a performance-based routing strategy with an unbalanced agent utilization; determine a third ordering of the plurality of agents according to a combination of the first ordering and the second ordering having a skewed agent utilization between the balanced agent utilization and the unbalanced agent utilization; and output a hybrid behavioral pairing model based on the third ordering for connecting a contact to an agent of the plurality of agents in the contact center system.

In another embodiment, the techniques may be realized as an article of manufacture for hybrid behavioral pairing in a contact center system comprising a non-transitory processor readable medium and instructions stored on the medium, wherein the instructions are configured to be readable from the medium by at least one computer processor communicatively coupled to the contact center system and thereby cause the at least one computer processor to operate so as to: determine a first ordering of a plurality of agents according to a behavioral pairing strategy with a balanced agent utilization; determine a second ordering of the plurality of agents according to a performance-based routing strategy with an unbalanced agent utilization; determine a third ordering of the plurality of agents according to a combination of the first ordering and the second ordering having a skewed agent utilization between the balanced agent utilization and the unbalanced agent utilization; and output a hybrid behavioral pairing model based on the third ordering for connecting a contact to an agent of the plurality of agents in the contact center system.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
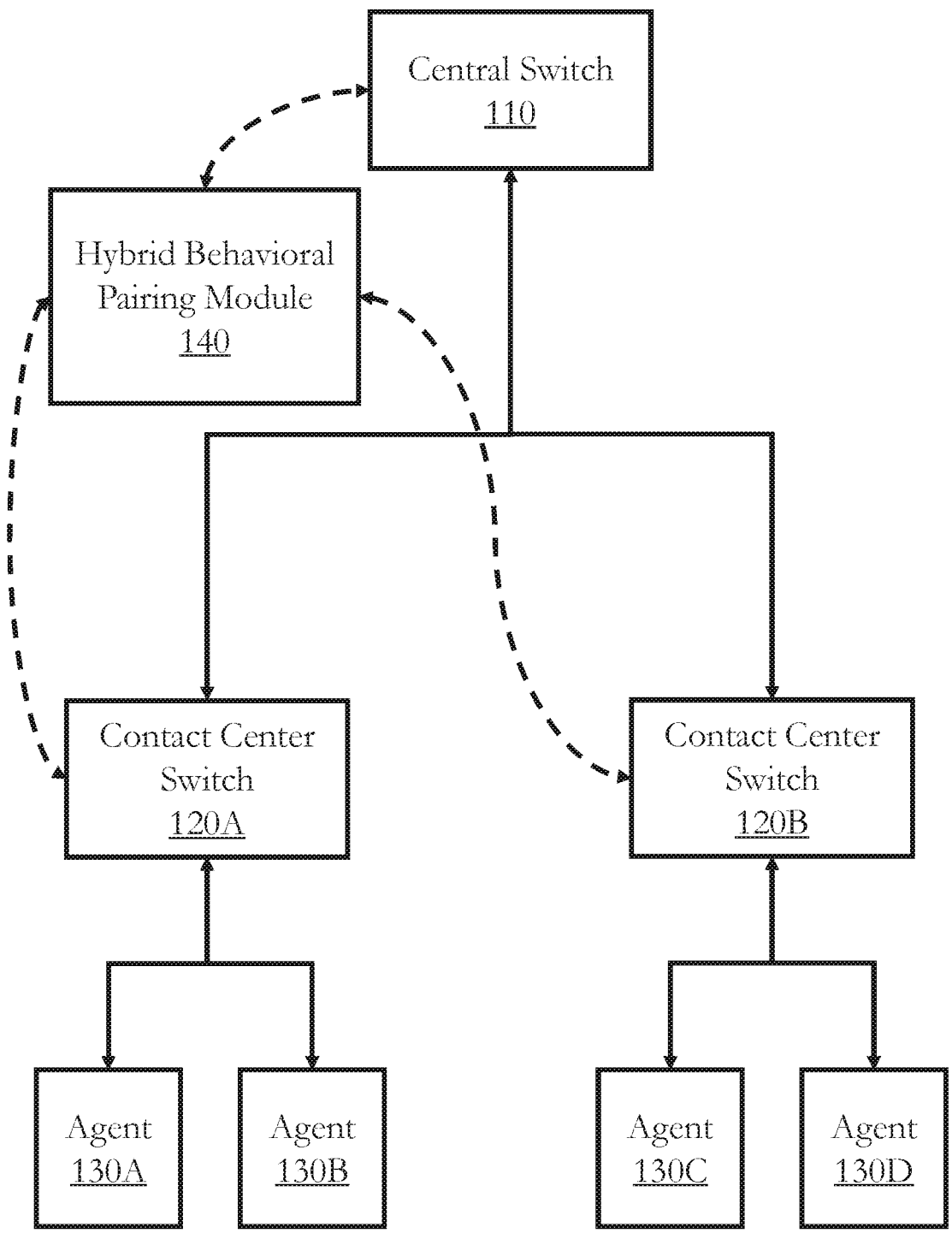
FIG. 1 shows a block diagram of a contact center according to embodiments of the present disclosure.

A typical contact center algorithmically assigns contacts arriving at the contact center to agents available to handle those contacts. At times, the contact center may be in an "L1 state" and have agents available and waiting for assignment to inbound or outbound contacts (e.g., telephone calls, Internet chat sessions, email). At other times, the contact center may be in an "L2 state" and have contacts waiting in one or more queues for an agent to become available for assignment. Such L2 queues could be inbound, outbound, or virtual queues. Contact center systems implement various strategies for assigning contacts to agents in both L1 and L2 states.

The present disclosure generally relates to contact center systems, traditionally referred to as "Automated Call Distribution" ("ACD") systems. Typically, such an ACD process is subsequent to an initial "Skills-based Routing" ("SBR") process that serves to allocate contacts and agents among skill queues within the contact center. Such skill queues may distinguish contacts and agents based on language capabilities, customer needs, or agent proficiency at a particular set of tasks.

The most common traditional assignment method within a queue is "First-In, First-Out" or "FIFO" assignment wherein the longest-waiting contact is assigned to the longest-waiting agent. Some contact centers implement "Performance-based Routing" ("PBR") wherein the longest waiting contact is assigned to the highest performing available agent. Variations of both such assignment methods commonly exist. For example, FIFO may select the least utilized available agent rather than the longest waiting agent. More generally, FIFO may select an agent most lagging in a particular metric or metrics. FIFO may also order queues of contacts where higher priority contact types may be positioned in a queue ahead of lower priority contact types. Similarly, PBR may be modified such that agent performance rankings may be altered depending on the type of contact pending assignment (e.g., Bala et al., U.S. Pat. No. 7,798,876). PBR may also be modified to avoid an extreme unbalancing of agent utilization by setting limits on maximum or minimum agent utilization relative to peers.

Variations of FIFO typically target "fairness" inasmuch as they are designed to balance the allocation of contacts to agents over time. PBR adopts a different approach in which the allocation of contacts to agents is purposefully skewed to increase the utilization of higher-performing agents and reduce the utilization of lower-performing agents. PBR may do so despite potential negative impacts on morale and productivity over time resulting from fatigue in over-utilized agents and inadequate opportunity for training and compensation in under-utilized agents.

The present disclosure refers to optimized strategies for assigning contacts to agents that improve upon traditional assignment methods, such as "Behavioral Pairing" or "BP" strategies. Behavioral Pairing targets balanced utilization of agents within queues (e.g., skill queues) while simultaneously improving overall contact center performance potentially beyond what FIFO or PBR methods will achieve in practice. This is a remarkable achievement inasmuch as BP acts on the same contacts and same agents as FIFO or PBR methods, approximately balancing the utilization of agents as FIFO provides, while improving overall contact center performance beyond what either FIFO or PBR provide in practice.

BP improves performance by assigning agent and contact pairs in a fashion that takes into consideration the assignment of potential subsequent agent and contact pairs such that when the benefits of all assignments are aggregated they may exceed those of FIFO and PBR strategies. In some cases, BP results in instant contact and agent pairings that may be the reverse of what FIFO or PBR would indicate. For example, in an instant case BP might select the shortest-waiting contact or the lowest-performing available agent. BP respects "posterity" inasmuch as the system allocates contacts to agents in a fashion that inherently forgoes what may be the highest-performing selection at the instant moment if such a decision increases the probability of better contact center performance over time.

As explained in detail below, embodiments of the present disclosure relate to techniques for "hybrid behavioral pairing" ("HBP"), which combines strategies of BP with strategies of PBR, in a manner in which a contact center administrator may adjust a balance between the two. For example, a contact center administrator may choose to have BP be the dominant mechanism for assigning agents from within a group with a bias toward performance-based routing. Instead of targeting a balanced agent utilization, HBP may target a skewed agent utilization. In some configurations, this bias or skew may be slight; for example, an HBP strategy may be calibrated to reduce or limit the number of occasions in which any one agent in a queue (e.g., skill queue) receives more than one contact pairing before other agents in the queue.

FIG. 1 shows a block diagram of a contact center system 100 according to embodiments of the present disclosure. The description herein describes network elements, computers, and/or components of a system and method for simulating contact center systems that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the contact center system may include a central switch 110. The central switch 110 may receive incoming contacts (e.g., callers) or support outbound connections to contacts via a dialer, a telecommunications network, or other modules (not shown). The central switch 110 may include contact routing hardware and software for helping to route contacts among one or more contact centers, or to one or more PBX/ACDs or other queuing or switching components within a contact center.

The central switch 110 may not be necessary if there is only one contact center, or if there is only one PBX/ACD routing component, in the contact center system 100. If more than one contact center is part of the contact center system 100, each contact center may include at least one contact center switch (e.g., contact center switches 120A and 120B). The contact center switches 120A and 120B may be communicatively coupled to the central switch 110.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 1, the central switch 110 routes contacts to one of two contact centers via contact center switch 120A and contact center switch 120B, respectively. Each of the contact center switches 120A and 120B are shown with two agents each. Agents 130A and 130B may be logged into contact center switch 120A, and agents 130C and 130D may be logged into contact center switch 120B.

The contact center system 100 may also be communicatively coupled to an integrated service from, for example, a third party vendor. In the example of FIG. 1, hybrid behavioral pairing module 140 may be communicatively coupled to one or more switches in the switch system of the contact center system 100, such as central switch 110, contact center switch 120A, or contact center switch 120B. In some embodiments, switches of the contact center system 100 may be communicatively coupled to multiple hybrid behavioral pairing modules. In some embodiments, hybrid behavioral pairing module 140 may be embedded within a component of a contact center system (e.g., embedded in or otherwise integrated with a switch).

The hybrid behavioral pairing module 140 may receive information from a switch (e.g., contact center switch 120A) about agents logged into the switch (e.g., agents 130A and 130B) and about incoming contacts via another switch (e.g., central switch 110) or, in some embodiments, from a network (e.g., the Internet or a telecommunications network) (not shown).

The hybrid behavioral pairing module 140 may process this information and to determine which contacts should be paired (e.g., matched, assigned, distributed, routed) with which agents. For example, multiple agents are available and waiting for connection to a contact (L1 state), and a contact arrives at the contact center via a network or central switch. As explained below, without the hybrid behavioral pairing module 140 or similar behavioral pairing module, a contact center switch will typically automatically distribute the new contact to whichever available agent has been waiting the longest amount of time for an agent under a "fair" FIFO strategy, or whichever available agent has been determined to be the highest-performing agent under a PBR strategy.

With the hybrid behavioral pairing module 140 or a similar behavioral pairing module, contacts and agents may be given scores (e.g., percentiles or percentile ranges/bandwidths) according to a pairing model or other artificial intelligence data model, so that a contact may be matched, paired, or otherwise connected to a preferred agent. In some embodiments, the hybrid behavioral pairing module 140 may be configured with an HBP strategy that blends the BP and PBR strategies, targeting biased rather than balanced agent utilization.

In an L2 state, multiple contacts are available and waiting for connection to an agent, and an agent becomes available. These contacts may be queued in a contact center switch such as a PBX or ACD device ("PBX/ACD"). Without the hybrid behavioral pairing module 140 or a similar behavioral pairing module, a contact center switch will typically connect the newly available agent to whichever contact has been waiting on hold in the queue for the longest amount of time as in a "fair" FIFO strategy or a PBR strategy when agent choice is not available. In some contact centers, priority queuing may also be incorporated.

With the hybrid behavioral pairing module 140 or similar behavioral pairing module in an L2 scenario, as in the L1 state described above, contacts and agents may be given percentiles (or percentile ranges/bandwidths, etc.) according to, for example, a model, such as an other artificial intelligence model, so that an agent coming available may be matched, paired, or otherwise connected to a preferred contact.

Under an HBP strategy, a hybridization factor or function may be applied to one or more orderings of agents to achieve the desired balance between a BP strategy, which targets a balanced utilization, and a PBR strategy, which targets a highly skewed utilization during periods of time when a contact center is in an L1 state (i.e., multiple agents available for assignment).

In some embodiments, a hybridization function may combine two (or more) orderings or other types of ranking systems together. For example, a contact center may have four agents: Agent A, Agent B, Agent C, and Agent D ("A", "B", "C", and "D") available for pairing with a contact. The agents may be ordered according to multiple ordering systems. For example, under a typical FIFO strategy, the agents may be ordered according to how long each agent has been waiting for an assignment relative to the other agents. Under a typical PBR strategy, the agents may be ordered according to how well each agent performs for some metric relative to the other agents. Under a BP strategy, the agents may be ordered according to the quality of each agent's "behavioral fit" relative to the other agents.

One technique for combining two orderings is to determine a sum. For example, if a PBR strategy orders the four agents as A=1, B=2, C=3, and D=4, the PBR strategy would preferably pair highest-performing Agent A with the next contact. And if a BP strategy order the agents as A=4, B=2, C=3, D=1, the BP strategy would preferably pair best-fitting Agent D with the next contact. In this example of an HBP strategy, the sum of the two orderings would be A=5, B=4, C=6, D=5. This HBP strategy would preferably pair Agent B with the next contact, which is the second highest-performing and second best-fitting agent according to the original orderings.

Other embodiments may use other techniques for combining multiple orderings of agents. For example, the HBP ordering may be a product obtained by multiplying two or more orderings. For another example, the HBP ordering may be a weighted sum or product obtained by scaling the one or more of the orderings by a scaling factor. In this way, HBP may be configured to weight an agent's relative performance more or less than the agent's relative behavioral fit.

Figure 2:
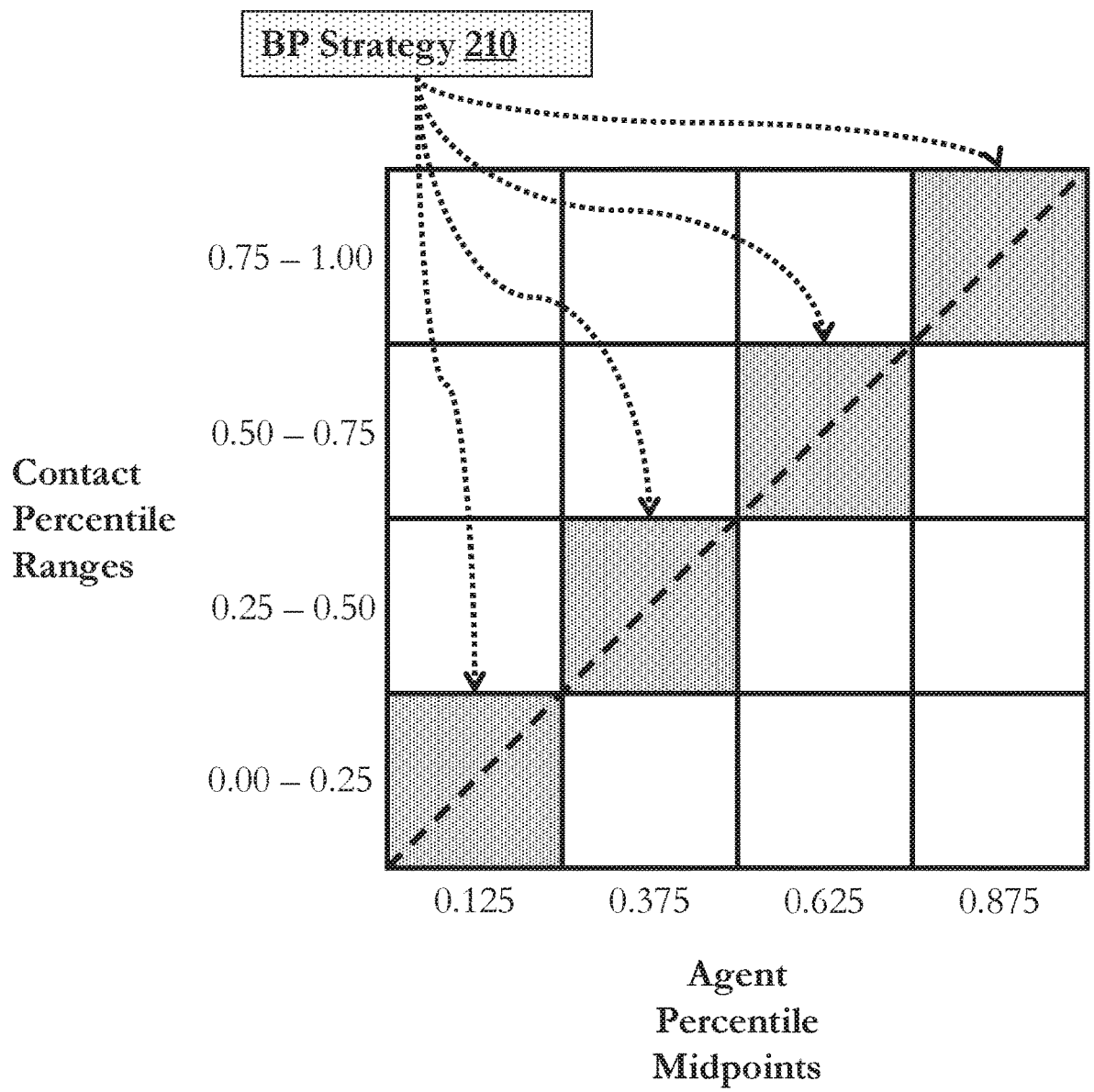
FIG. 2 shows a schematic representation of a queue according to embodiments of the present disclosure.

FIG. 2 shows a queue 200 according to embodiments of the present disclosure operating under BP Strategy 210. Queue 200 represents a simplified hypothetical case in which four types of contacts may be assigned to any of four agents in an environment in which the contact center is seeking to maximize a desired metric (e.g., sales). The four evenly distributed types of contacts are assigned percentile ranges (or "bandwidths") of 0.00 to 0.25 ("0-25% Contacts"), 0.25 to 0.50 ("25-50% Contacts"), 0.50 to 0.75 ("50-75% Contacts"), and 0.75 to 1.00 (75-100% Contacts). The four agents occupy equally-spaced percentile bandwidths and are assigned percentiles at the midpoints of their respective ranges: 0.00 to 0.25 ("0.125 Agent"), 0.25 to 0.50 ("0.375 Agent"), 0.50 to 0.75 ("0.625 Agent"), and 0.75 to 1.00 ("0.875 Agent"). The four agents may also be ordered by performance according to a desired metric (e.g., sales), such that the lowest-performing agent is assigned the lowest percentile (the 0.125 Agent), and the highest-performing agent is assigned the highest percentile (the 0.875 Agent).

By applying a diagonal strategy, 0-25% Contacts may be preferably assigned to the 0.125 Agent, 25-50% Contacts may be preferably assigned to the 0.375 Agent, 50-75% Contacts may be preferably assigned to the 0.625 Agent, and 75-100% Contacts may be preferably assigned to the 0.875 Agent. BP Strategy 210 targets a balanced utilization, with each agent receiving approximately the same proportion of contacts over time. Accordingly, there is no bias toward a PBR strategy, under which agent utilization would be skewed toward utilizing the highest-performing 0.875 Agent more heavily.

One such technique for generating the performance-biased agent percentiles according to embodiments of the present disclosure is to adjust each agent's "initial" midpoint percentile ("$AP_{initial}$") by a hybridization function or factor, such that relatively higher-ordered (e.g., higher-performing) agents occupy relatively larger bandwidths (i.e., disproportionate bandwidths) and, consequently, receive relatively more contacts than lower-ordered (e.g., lower-performing) agents. For example, the hybridization function may raise each agent's percentile to a power, as in Equation 1 below:

$$AP_{initial} = AP_{initial}^{\kappa} \qquad \text{(Eqn. 1)}$$

The power parameter (e.g., "κ" or a "Kappa parameter" as in Equation 1 may determine the amount of bias toward PBR, with higher values of Kappa generating greater amounts of bias. A Kappa parameter of 1.0 would generate no bias ($AP_{adjusted} = AP_{initial}$). Thus, this "neutral" value for Kappa results in targeting a balanced agent utilization. In fact, BP Strategy 210 is equivalent to a Kappa-based HBP strategy in which Kappa equals 1.0. As Kappa increases, the degree of agent utilization skew increases as bias toward PBR increases.

Figure 3:
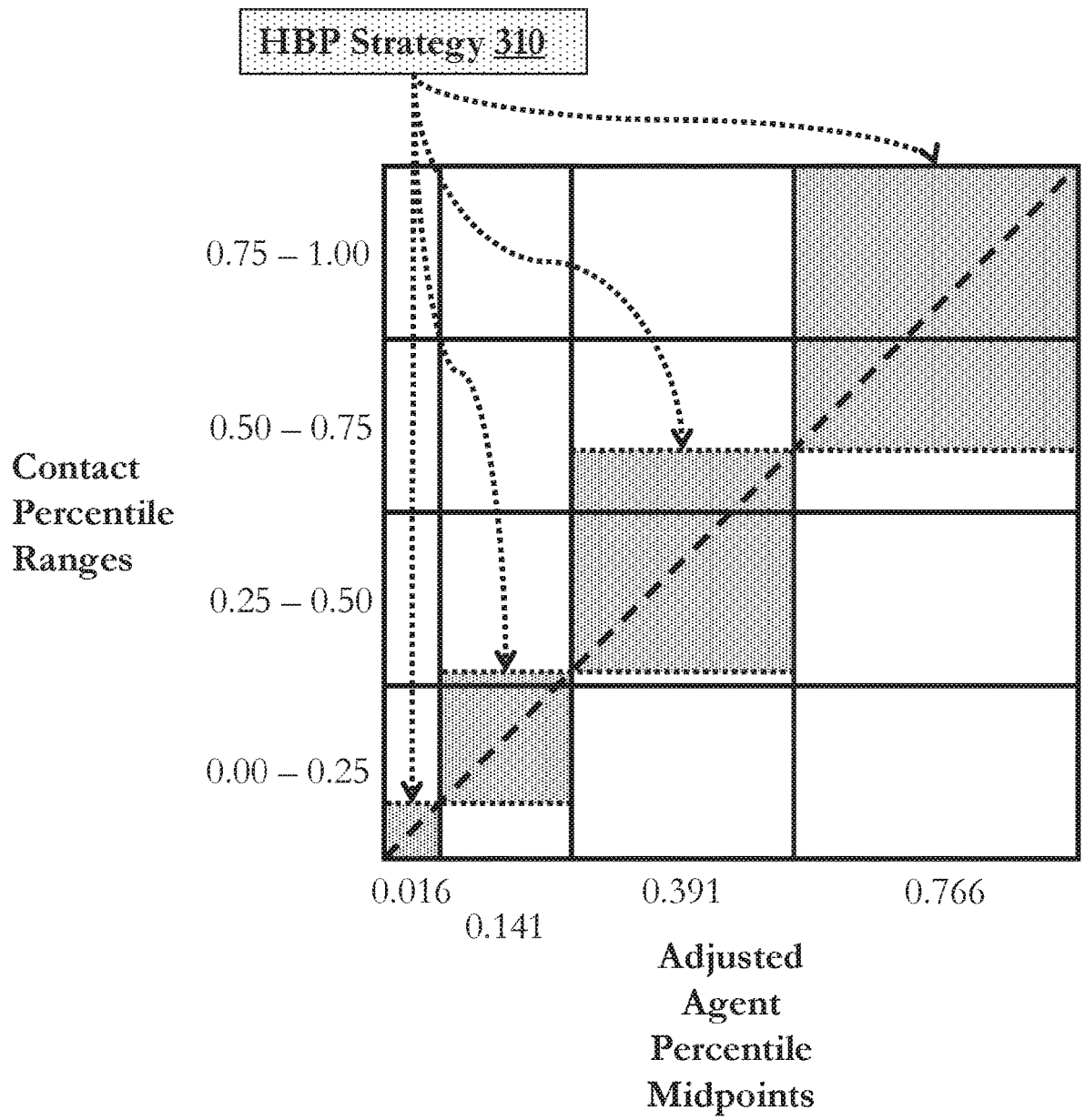
FIG. 3 shows a schematic representation of a queue according to embodiments of the present disclosure.

FIG. 3 shows a queue 300 that applies this technique using a Kappa value of 2.0. Queue 300 represents the same four types of contacts and the same four agents as in queue 200. However, in queue 300, the agents' percentile midpoints have been squared ($AP_{adjusted}=AP_{initial}^{2.0}$). Applying a diagonal strategy under HBP Strategy 310, the lowest-ordered agent ($AP_{adjusted}\approx 0.016$) would occupy the smallest bandwidth and receive the fewest contacts, and so on, up to the highest-ordered agent ($AP_{adjusted}0.766$), who would occupy the largest bandwidth and receive the most contacts.

In some embodiments, the bandwidth of each agent may be determined so that each agent's adjusted percentile midpoint is the midpoint of each agent's new, adjusted bandwidth. For example, the bandwidth of the lowest-ordered 0.016 agent may be approximately 0.000 to 0.031 In other embodiments, the bandwidth of each agent may be determined by equally distributing the "distance" between neighboring adjusted percentile midpoints. For example, the bandwidth of the lowest-ordered 0.016 agent may be approximately 0.000 to 0.079.

Another variation of the HBP technique applied to queue 300 in FIG. 3 is to adjust each agent's initial percentile ranges rather than each agent's initial midpoint percentile, as in Equation 2 below:

$$AP_{adjusted\_range}=AP_{initial\_range}^{\kappa} \qquad \text{(Eqn. 2)}$$

The effect would be the same: relatively higher-ordered (e.g., higher-performing) agents occupy relatively larger bandwidths and, consequently, receive relatively more contacts than lower-ordered (e.g., lower-performing) agents.

Figure 4:
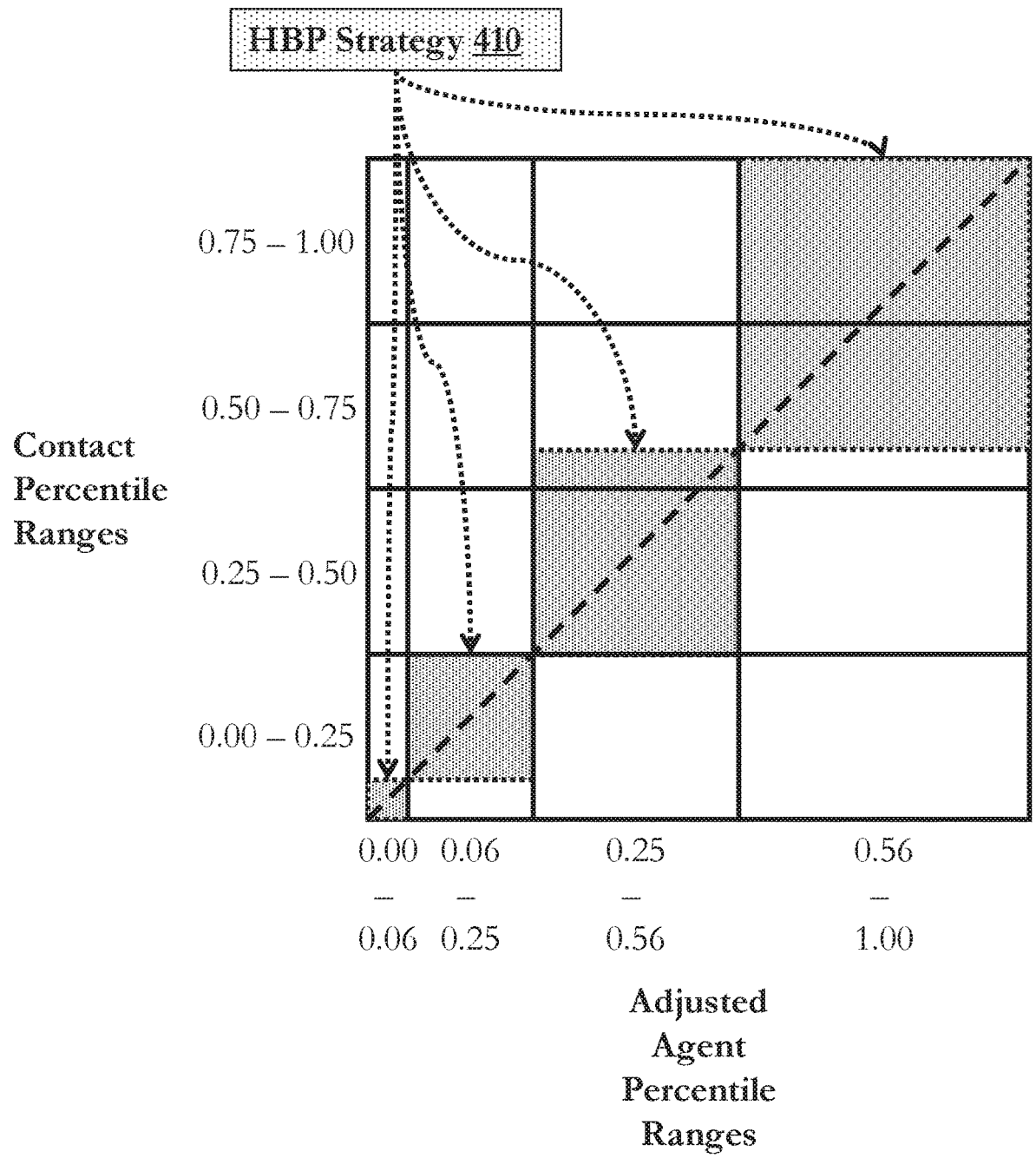
FIG. 4 shows a schematic representation of a queue according to embodiments of the present disclosure.

FIG. 4 shows a queue 400 that applies this technique using a Kappa value of 2.0. Queue 400 represents the same four contact types and agents as in queue 300. However, in queue 400, the agents' initial percentile ranges have been squared ($AP_{adjusted\_range}=AP_{initial\_range}^{2.0}$) instead of their initial midpoint percentiles. Applying a diagonal strategy under HBP Strategy 410, the lowest-ordered agent (occupying adjusted percentile range from 0.00 to approximately 0.06 with a midpoint of approximately 0.03) would receive the fewest contacts, and so on, up to the highest-ordered agent (occupying adjusted percentile range from approximately 0.56 to 1.00 with a midpoint of approximately 0.82) would receive the most contacts.

Conceptually, the target skewed utilization would result in the bottom-half of agents receiving approximately one-fourth of the contacts, and the top-half of the agents receiving the other three-fourths. Other techniques for visualizing or implementing these hybridization functions or factors include adjusting the "fitting function" of the diagonal strategy.

Figure 5:
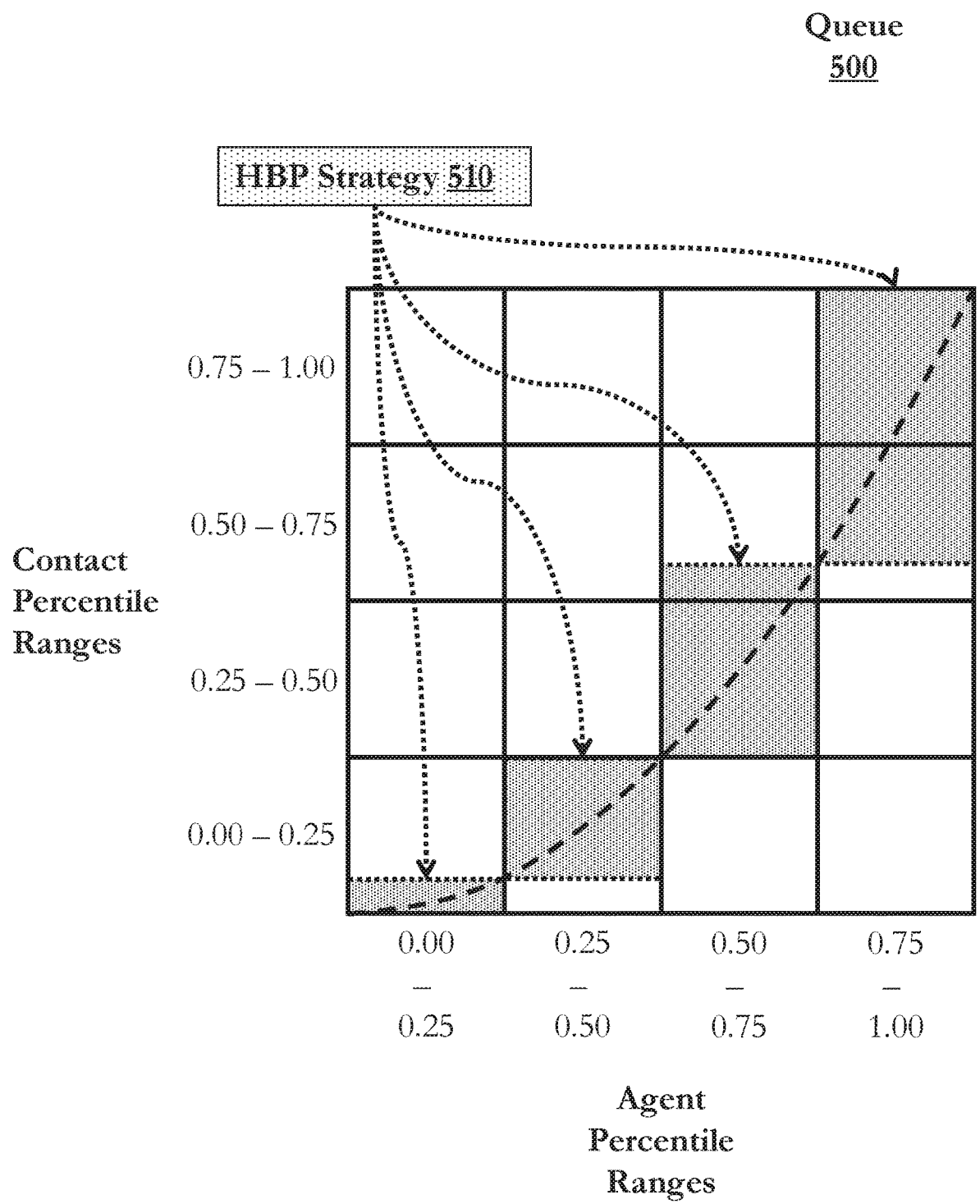
FIG. 5 shows a schematic representation of a queue according to embodiments of the present disclosure.

FIG. 5 shows a queue 500 with the same agent percentiles and ranges as in queue 100 (FIG. 1), and they have not been adjusted. Unlike queue 100, in which BP Strategy 110 may be visualized by a 45-degree diagonal line (CP=AP), HBP strategy 510 may be visualized by a different, hybridized fitting function (e.g., "bending" or "bowing" the diagonal line). In the example, of FIG. 5, the fitting function is an exponential function, as in Equation 3 below:

$$CP=AP^{\kappa} \qquad \text{(Eqn. 3)}$$

Conceptually, instead of determining preferred pairings by selecting pairs closest to the diagonal CP=AP as in BP Strategy 110, preferred pairings in HBP Strategy 510 may be determined by selecting pairs closest to the exponential $CP=AP^{2.0}$ as in queue 500 where Kappa equals 2.0. Notably, the effect of fitting to a curve (e.g., $CP=AP^{2.0}$) is the continuous mathematical analogue to the discontinuous process of broadening or shrinking percentile ranges (e.g., squaring the percentile ranges and then fitting to CP=AP), as in queue 400 and HBP Strategy 410 (FIG. 4).

Many variations of hybridization functions may be used to vary the target utilization of an agent as a function of the agent's performance or other ordering or metric. For example, a hybridization function may be a piecewise function.

Figure 6:
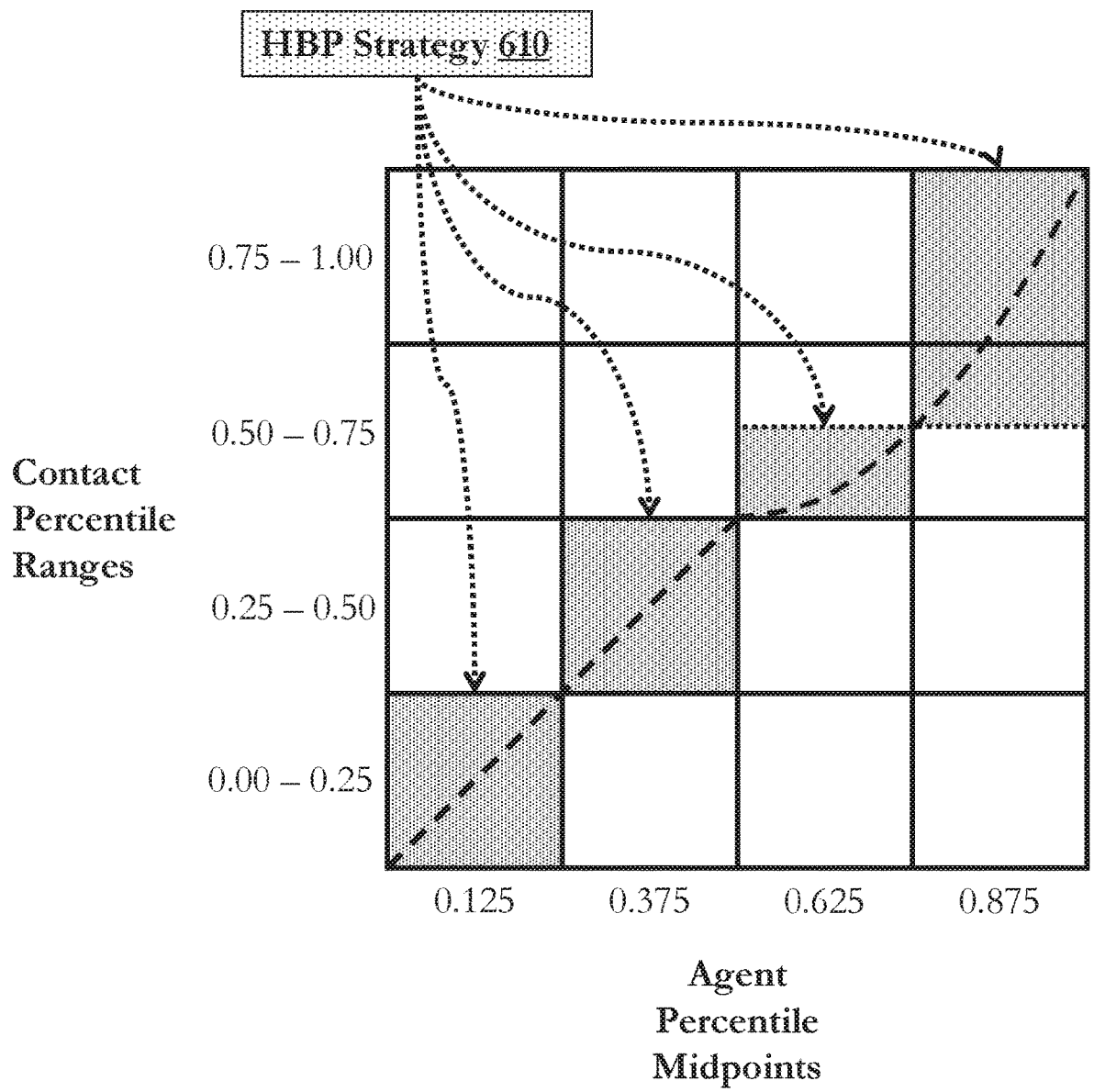
FIG. 6 shows a schematic representation of a queue according to embodiments of the present disclosure.

FIG. 6 shows a queue 600 and HBP Strategy 610 that affects the utilization of the bottom-half of the agents differently than that of the top-half of the agents. For example, the contact center may determine that half of the contacts should be distributed to below-average agents in a balanced manner (e.g., Kappa=1.0), but the other half of the contacts should be distributed to above-average agents according to their relative performance (e.g., Kappa>1.0). Thus, contacts ranging from 0% to 50% may be distributed to the lower-performing agents (0.125 Agent and 0.375 Agent) evenly, visualized as a fit along the 45-degree line CP=AP for $0.00 \le AP<0.50$ (or, e.g., $0.00<AP\le 0.50$, etc.). Contacts ranging from 50% to 100% may be distributed to the higher-performing agents (0.625 Agent and 0.875 Agent) as a function of their performance, such as an exponential function scaled to this portion of contacts and agents. HBP Strategy 610 may be visualized as a fit along the exponential curve $CP=2(AP-0.5)^{2.0}+0.5$ for Kappa=2.0 and $0.50 \le AP<1.00$.

Figure 7:
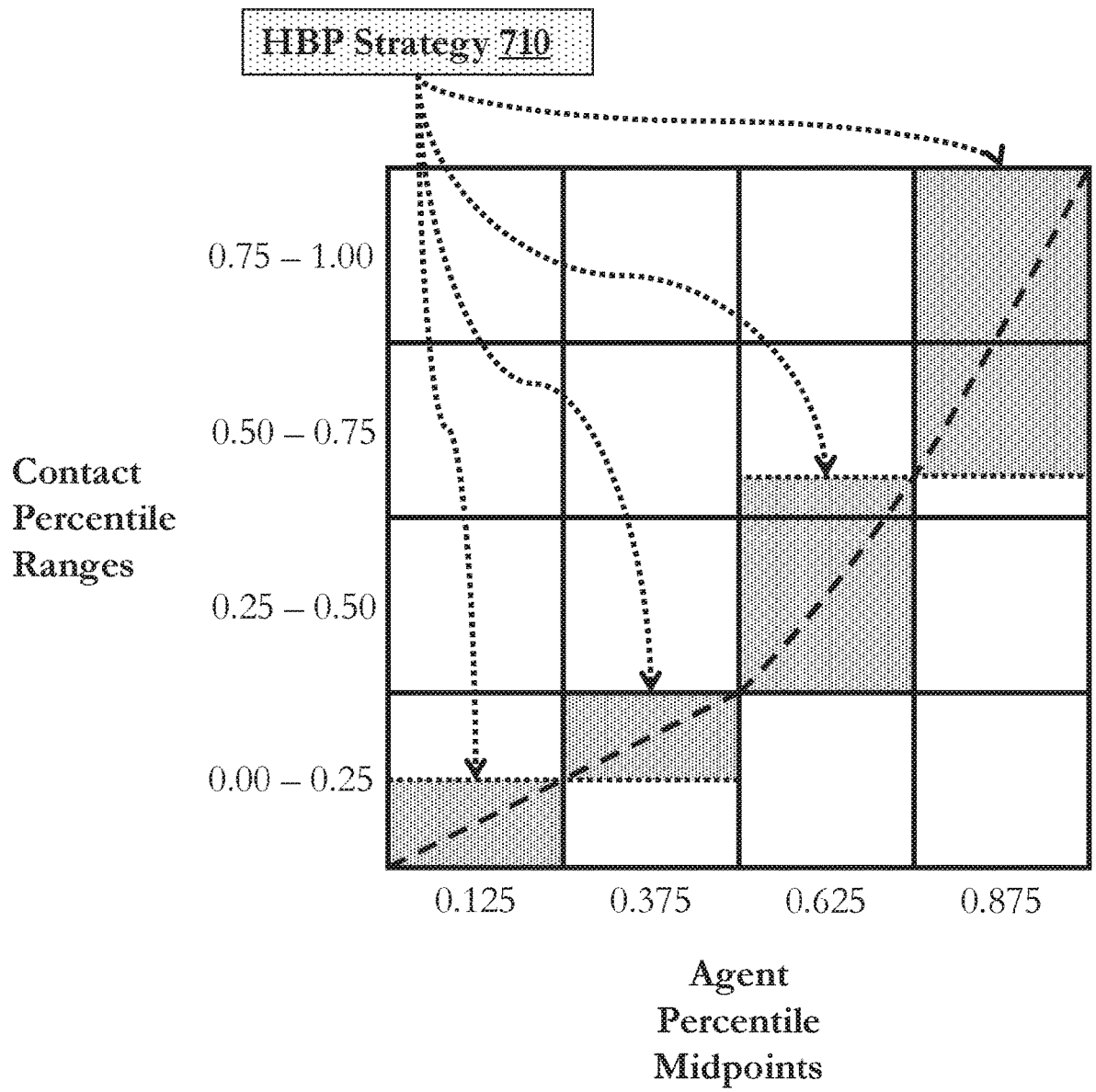
FIG. 7 shows a schematic representation of a queue according to embodiments of the present disclosure.

Incidentally, such a strategy would result in some higher-performing agents (here, the 0.625 Agent) receiving fewer contacts over time than its lower-performing peers. FIG. 7 shows a queue 700 and HBP Strategy 710 that also affects the utilization of the bottom-half of the agents differently than that of the top-half of the agents using a piecewise hybridization function. For example, the contact center may determine that a larger portion of contacts should be distributed to above-average agents according to their relative performance (e.g., Kappa>1.0), and the remaining portion of contacts should be distributed to below-average agents in a balanced manner (e.g., Kappa=1.0). Thus, for Kappa=2.0 and $AP \ge 0.50$ (or AP>0.50), pairings may be fit along the exponential curve $CP=AP^{2.0}$. For Kappa=1.0 and AP<0.50, pairings may be fit along a linear function, scaled to this portion of contacts and agents: CP=0.5·AP.

In real-world contact centers, there may be more or fewer agents, and more or fewer contact types in a queue. In these examples, each contact type is evenly distributed within the total range of percentile ranks; however, in some contact centers, the distribution of ranges could vary based on, for example, the frequency at which contacts of a particular type arrive at a contact center relative to the frequency at which contacts of other types arrive. The simplified examples described above, with four agents and four contact types, are used to illustrate the effects of an implicit form of HBP such as those based on a Kappa parameter and exponential scaling or other hybridization functions. However, HBP—including Kappa-based techniques—may also be applied to bigger, more complex, real-world contact centers.

In some embodiments, Kappa may be selected or adjusted to vary the bias toward PBR (or skew in agent utilization). For example, Kappa less than 2.0 (e.g., 1.0, 1.01, 1.1, 1.2, 1.5, etc.) would result in relatively less bias toward PBR than the examples above in which Kappa equals 2.0. For example, if a contact center administrator wanted to avoid occurrences of higher-performing agents receiving multiple calls while a lower-performing agent remains idle, a significantly lower value of Kappa may be more appropriate than 2.0. Conversely, Kappa greater than 2.0 (e.g., 2.01, 2.1, 2.5, 200.0, etc.) would result in relatively more bias toward PBR.

Importantly, the effect on agent utilization is subtle under Kappa-based HBP strategies inasmuch as they controllably affect the degree to which agents wait between contacts. By increasing the power to which agent percentiles are raised, this invention controllably decreases the average time between contacts for higher-ordered agents and increases the average time between contacts for comparatively lower-ordered agents. Similarly, reducing the power to which agent percentiles are raised has the reverse effect. For neutral BP strategies (e.g., Kappa=1.0), each agent has approximately the same expected average waiting time between contacts. As Kappa increases, the relative expected average waiting time progressively (e.g., exponentially) decreases as relative agent performance increases.

In some embodiments, an HBP strategy may target relative agent utilization using potentially more gradual techniques. For example, agents may be assigned relative "utilization adjustments" based on agent ordering. In one example, the highest-ordered agent may be assigned a relative utilization adjustment of 100%, the second-highest agent a relative utilization of 99%, the third 98%, and so on. In this example, the target utilization of the second-highest ordered agent would be 99% of the target utilization of the highest-performing agent. The relative utilization adjustment may be more aggressive in other configurations. For example, the highest-ordered agent may be assigned a relative utilization of 100%, the second-highest agent 90%, the third 80%, and so on. In this example, the target utilization of the second-highest ordered agent would be 90% of the target utilization of the highest-performing agent.

Figure 8:
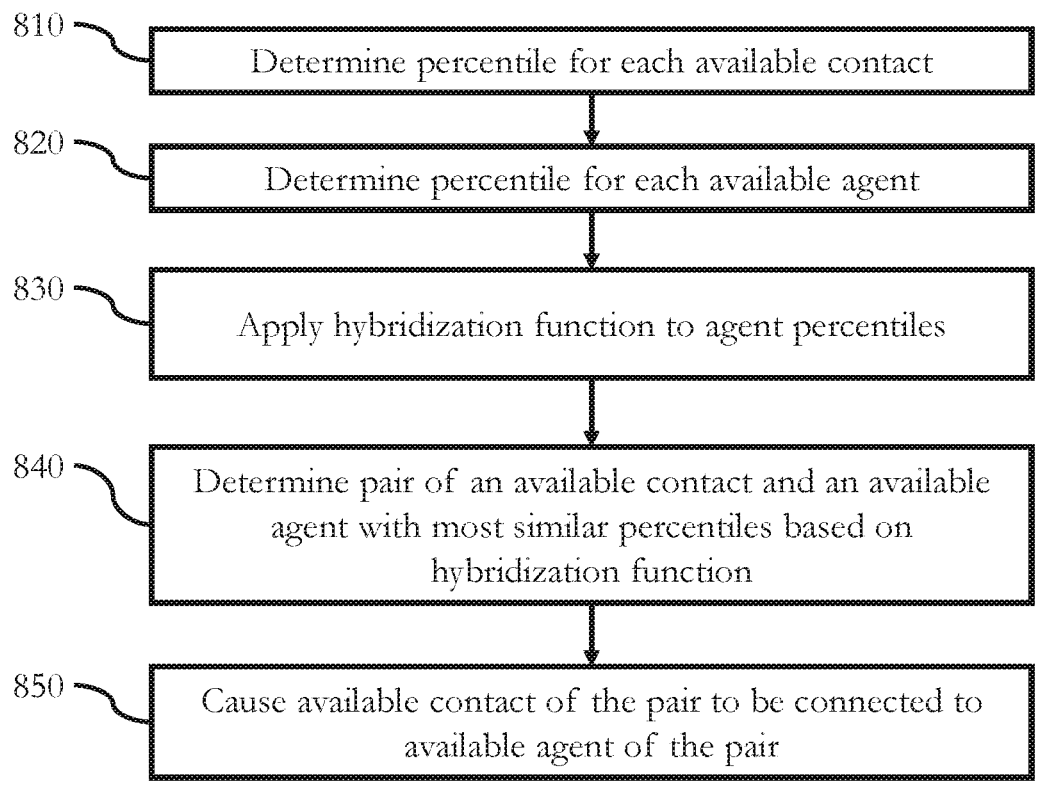
FIG. 8 shows a flow diagram of a hybrid behavioral pairing method according to embodiments of the present disclosure.

FIG. 8 shows a hybrid behavioral pairing method 800 according to embodiments of the present disclosure. At block 810, hybrid behavioral pairing method 800 may begin.

At block 810, a percentile (or n-tile, quantile, percentile range, bandwidth, or other type of "score" or range of scores, etc.) may be determined for each available contact. For situations in which contacts are waiting on hold in a queue, percentiles may be determined for each of the contacts waiting on hold in the queue. For situations in which contacts are not waiting on hold in a queue, a percentile may be assigned to the next contact to arrive at the contact center. The percentiles may be bounded by a range of percentiles defined for a particular type or group of contacts based on information about the contact. The percentile bounds or ranges may be based on a frequency distribution or other metric for the contact types. The percentile may be randomly assigned within the type's percentile range.

In some embodiments, percentiles may be ordered according to a particular metric or combination of metrics to be optimized in the contact center, and a contact determined to have a relatively high percentile may be considered to be a "higher-value" contact for the contact center inasmuch as these contacts are more likely to contribute to a higher overall performance in the contact center. For example, a relatively high-percentile contact may have a relatively high likelihood of making a purchase.

In some embodiments, a percentile may be determined for a contact at the time the contact arrives at the contact center. In other embodiments, a percentile may be determined for the contact at a later point in time, such as when the contact arrives at a particular skill queue or ACD system, or when a request for a pairing is made.

After a percentile has been determined for each contact available for pairing, behavioral pairing method 800 may proceed to block 820. In some embodiments, block 820 may be performed prior to, or simultaneously with, block 810.

At block 820, a percentile may be determined for each available agent. For situations in which agents are idle, waiting for contacts to arrive, percentiles may be determined for each of the idle agents. For situations in which agents for a queue are all busy, a percentile may be determined to the next agent to become available. The percentiles may be bounded by a range of percentiles (e.g., "bandwidth") defined based on all of agents assigned to a queue (e.g., a skill queue) or only the available agents assigned to a particular queue. In some embodiments, the bounds or ranges of percentiles may be based on a desired agent utilization (e.g., for fairness, efficiency, or performance).

In some embodiments, agent percentiles may be ordered according to a particular metric or combination of metrics to be optimized in the contact center, and an agent determined to have a relatively high percentile may be considered to be a higher-performing agent for the contact center. For example, a relatively high-percentile agent may have a relatively high likelihood of making a sale.

In some embodiments, an agent's percentile may be determined at the time the agent becomes available within the contact center. In other embodiments, a percentile may be determined at a later point in time, such as when a request for a pairing is made.

After a percentile has been determined for each available agent and contact, behavioral pairing method 800 may proceed to block 830.

At block 830, a hybridization function may be applied to agent percentiles (or agent percentile ranges or bandwidths). For example, a Kappa value may be determined for an exponential hybridization function or fitting curve or line. In some embodiments, the hybridization function may act on a single ordering that implicitly incorporates both behavioral fit and performance information. In other embodiments, the hybridization function may combine (e.g., add, multiply, weight) multiple orderings of agents. After the hybridization function has been applied or otherwise determined or configured, hybrid behavioral pairing method 800 may proceed to block 840.

At block 840, a pair of an available contact and an available agent may be determined based on the percentiles (or percentile ranges) determined for each available contact at block 810 and for each available agent at block 820 based on a hybridization function. In some embodiments, the selection may be determined based on percentiles or percentile ranges for each available agent adjusted at block 830. In some embodiments, the pair may be determined according to a diagonal strategy, in which contacts and agents with more similar percentiles (or the most similar percentiles) may be selected for pairing. For example, a hybrid behavioral pairing module may select a contact-agent pairing with the smallest absolute difference between the contact's score and the agent's score. In some embodiments, the diagonal strategy may be visualized as a 45-degree diagonal line. In other embodiments, the diagonal strategy may be visualized as a hybridization function (e.g., continuously differentiable functions such as an exponential function, a linear function, a logarithmic function, a sigmoidal function, a logistic function, a logit function, or not continuously differentiable functions such as piecewise functions).

In some situations, multiple agents may be idle when a contact arrives (an L1 state). Under HBP, the newly available contact may be paired with a selected one of the available agents that has an adjusted percentile or percentile range more similar to the contact's percentile than other available agents. In other situations, multiple contacts may be waiting in a queue when an agent becomes available (an L2 state). Under HBP, the newly available agent may be paired with a selected one of the contacts waiting in the queue that has a percentile more similar to the agent's adjusted percentile or percentile range than other contacts waiting in the queue.

In some situations, selecting a pairing based on similarity of scores may result in selecting an instant pairing that might not be the highest performing instant pairing, but rather increases the likelihood of better future pairings.

After a pairing has been determined at block 840, hybrid behavioral pairing method 800 may proceed to block 850. At block 850, modules within the contact center system may cause the contact and agent of the contact-agent pair to be connected with one another. For example, a behavioral pairing module may indicate that an ACD system or other routing device may distribute a particular contact to a particular agent.

After connecting the contact and agent at block 850, behavioral pairing method 800 may end. In some embodiments, behavioral pairing method 800 may return to block 840 for determining one or more additional pairings (not shown). In other embodiments, behavioral pairing method 800 may return to block 810 or block 820 to determine (or re-determine) percentiles or percentile ranges for available contacts or agents (not shown), and subsequently apply (or reapply) a hybridization function at block 840.

At this point it should be noted that hybrid behavioral pairing in a contact center system in accordance with the present disclosure as described above may involve the processing of input data and the generation of output data to some extent. This input data processing and output data generation may be implemented in hardware or software. For example, specific electronic components may be employed in a behavioral pairing module or similar or related circuitry for implementing the functions associated with behavioral pairing in a contact center system in accordance with the present disclosure as described above. Alternatively, one or more processors operating in accordance with instructions may implement the functions associated with behavioral pairing in a contact center system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for behavioral pairing in a contact center system comprising:
    ordering, by at least one computer processor communicatively coupled to and configured to perform behavioral pairing operations in the contact center system, a plurality of contacts available for connection to an agent according to a respective score or range of scores representing how each contact of the plurality of contacts contributes to a higher performance of the contact center system;
    ordering, by the at least one computer processor, a plurality of agents available for connection to a contact according to at least one performance metric to be optimized in the contact center system;
    applying, by the at least one computer processor, a hybridization function to the ordering of the plurality of agents to bias a contact-agent pairing strategy toward a skewed agent utilization;
    selecting, by the at least one computer processor, a contact-agent pairing from the plurality of contacts and the plurality of agents based at least in part on the biased contact-agent pairing strategy; and
    establishing, by the at least one computer processor, in a switch of the contact center system, a connection between the contact and the agent in the contact-agent pairing based upon the selecting.

2. The method of claim 1, wherein the ordering of the plurality of contacts comprises determining, by the at least one computer processor, a bandwidth for a contact type of the plurality of contacts proportionate to a frequency at which contacts of the contact type become available for assignment.

3. The method of claim 1, wherein applying the hybridization function comprises controllably targeting, by the at least one computer processor, an unbalanced agent utilization.

4. The method of claim 3, wherein applying the hybridization function comprises determining, by the at least one computer processor, disproportionate bandwidth for each of the one or more agents.

5. The method of claim 1, wherein the selected contact-agent pairing results in a worse expected instant outcome than other non-selected contact-agent pairings.

6. The method of claim 1, wherein each successively higher-ordered agent of the plurality of agents is more likely to be selected than respectively lower-ordered agents.

7. The method of claim 1, wherein each successively higher-ordered agent of the plurality of agents is targeted to have a lower average waiting time than respectively lower-ordered agents.

8. A system for behavioral pairing in a contact center system comprising:
    at least one computer processor communicatively coupled to and configured to perform behavioral pairing operations in the contact center system, wherein the at least one computer processor is configured to:
        order a plurality of contacts available for connection to an agent according to a respective score or range of scores representing how each contact of the plurality of contacts contributes to a higher performance of the contact center system;

order a plurality of agents available for connection to a contact according to at least one performance metric to be optimized in the contact center system;
apply a hybridization function to the ordering of the plurality of agents to bias a contact-agent pairing strategy toward a skewed agent utilization;
select a contact-agent pairing from the plurality of contacts and the plurality of agents based at least in part on the biased contact-agent pairing strategy; and
establish, in a switch of the contact center system, a connection between the contact and the agent in the contact-agent pairing based upon the selecting.

9. The system of claim 8, wherein the ordering of the plurality of contacts comprises determining a bandwidth for a contact type of the plurality of contacts proportionate to a frequency at which contacts of the contact type become available for assignment.

10. The system of claim 8, wherein applying the hybridization function comprises controllably targeting an unbalanced agent utilization.

11. The system of claim 10, wherein applying the hybridization function comprises determining disproportionate bandwidth for each of the one or more agents.

12. The system of claim 8, wherein the selected contact-agent pairing results in a worse expected instant outcome than other non-selected contact-agent pairings.

13. The system of claim 8, wherein each successively higher-ordered agent of the plurality of agents is more likely to be selected than respectively lower-ordered agents.

14. The system of claim 8, wherein each successively higher-ordered agent of the plurality of agents is targeted to have a lower average waiting time than respectively lower-ordered agents.

15. An article of manufacture for behavioral pairing in a contact center system comprising:
a non-transitory processor readable medium; and
instructions stored on the medium;
wherein the instructions are configured to be readable from the medium by at least one computer processor communicatively coupled to and configured to perform behavioral pairing operations in the contact center system and thereby cause the at least one computer processor to operate so as to:
order a plurality of contacts available for connection to an agent according to a respective score or range of scores representing how each contact of the plurality of contacts contributes to a higher performance of the contact center system;
order a plurality of agents available for connection to a contact according to at least one performance metric to be optimized in the contact center system;
apply a hybridization function to the ordering of the plurality of agents to bias a contact-agent pairing strategy toward a skewed agent utilization;
select a contact-agent pairing from the plurality of contacts and the plurality of agents based at least in part on the biased contact-agent pairing strategy; and
establish, in a switch of the contact center system, a connection between the contact and the agent in the contact-agent pairing based upon the selecting.

16. The article of manufacture of claim 15, wherein the ordering of the plurality of contacts comprises determining a bandwidth for a contact type of the plurality of contacts proportionate to a frequency at which contacts of the contact type become available for assignment.

17. The article of manufacture of claim 15, wherein applying the hybridization function comprises controllably targeting an unbalanced agent utilization.

18. The article of manufacture of claim 15, wherein the selected contact-agent pairing results in a worse expected instant outcome than other non-selected contact-agent pairings.

19. The article of manufacture of claim 15, wherein each successively higher-ordered agent of the plurality of agents is more likely to be selected than respectively lower-ordered agents.

20. The article of manufacture of claim 15, wherein each successively higher-ordered agent of the plurality of agents is targeted to have a lower average waiting time than respectively lower-ordered agents.

* * * * *